(12) United States Patent
Nakagawa (10) Patent No.: US 8,594,720 B2
(45) Date of Patent: Nov. 26, 2013

(54) ELECTRONIC DEVICE PROVIDED WITH WIRELESS COMMUNICATION FUNCTION, DETECTION OF WHETHER THE ELECTRONIC DEVICE IS IN A USED CONDITION OR AN UNUSED CONDITION FUNCTION, AND SHIFTING THE ELECTRONIC DEVICE TO A POWER-SAVING MODE FUNCTION

(75) Inventor: Makoto Nakagawa, Ome (JP)

(73) Assignee: Casio Computer Co., Ltd, Tokyo (JP)

( * ) Notice: Subject to any disclaimer, the term of this patent is extended or adjusted under 35 U.S.C. 154(b) by 116 days.

(21) Appl. No.: 13/308,643

(22) Filed: Dec. 1, 2011

(65) Prior Publication Data

US 2012/0140601 A1 Jun. 7, 2012

(30) Foreign Application Priority Data

Dec. 6, 2010 (JP) ................................. 2010-271038

(51) Int. Cl.
*H04B 7/00* (2006.01)
(52) U.S. Cl.
USPC ....... 455/522; 455/574; 455/343.1; 455/41.2; 370/318
(58) Field of Classification Search
USPC ................ 455/522, 574, 343.1, 343.2, 127.5; 370/318, 324, 276
See application file for complete search history.

(56) References Cited

U.S. PATENT DOCUMENTS

| | | | | |
|---|---|---|---|---|
| 5,359,594 A | * | 10/1994 | Gould et al. ................ | 370/276 |
| 5,461,266 A | * | 10/1995 | Koreeda et al. ............. | 307/125 |
| 5,586,333 A | * | 12/1996 | Choi et al. .................. | 713/320 |
| 5,637,932 A | * | 6/1997 | Koreeda et al. .............. | 307/125 |
| 6,263,200 B1 | * | 7/2001 | Fujimoto .................... | 455/343.5 |
| 7,050,838 B1 | * | 5/2006 | Muramatsu et al. ........ | 455/556.1 |
| 7,062,302 B2 | * | 6/2006 | Yamaoka ..................... | 455/574 |
| 7,194,248 B2 | * | 3/2007 | Kim ........................... | 455/343.1 |
| 7,224,937 B2 | * | 5/2007 | Cheng ......................... | 455/39 |
| 7,283,851 B2 | * | 10/2007 | Persico et al. ............... | 455/574 |
| 7,685,606 B2 | * | 3/2010 | Chang ......................... | 719/318 |
| 7,856,526 B2 | * | 12/2010 | Shibayama et al. ......... | 711/112 |
| 7,920,504 B2 | * | 4/2011 | Muqattash et al. .......... | 370/318 |
| 7,937,100 B2 | * | 5/2011 | Kim et al. ................... | 455/509 |
| 8,135,427 B2 | * | 3/2012 | Muqattash et al. .......... | 455/522 |
| 8,164,467 B2 | * | 4/2012 | Hirabayashi et al. ........ | 340/636.1 |
| 2005/0221790 A1 | * | 10/2005 | Persico et al. .............. | 455/343.2 |
| 2006/0014516 A1 | * | 1/2006 | Cheng ......................... | 455/343.5 |
| 2007/0142098 A1 | * | 6/2007 | Behzad et al. ............... | 455/574 |

(Continued)

FOREIGN PATENT DOCUMENTS

JP 2010-117286 5/2010

*Primary Examiner* — Minh D Dao
(74) *Attorney, Agent, or Firm* — Turocy & Watson, LLP (57) ABSTRACT

An electronic device includes: a communication section to wirelessly communicate with an external device; a first section to make the communication section establish a wireless connection with the external device; a detective section to detect whether the electronic device is in a used condition or an unused condition; a second section to shift to a power-saving mode when the unused condition is detected for a while; and a third section to cancel the power-saving mode when the used condition is detected during the power-saving mode, wherein the second section cuts off the connection if the connection is still alive when shifting to the power-saving mode; and the third section changes a connection processing for making the first section establish the connection after the power-saving mode was canceled, based on a connecting condition from a time of detecting the last used condition to a time of shifting to the power-saving mode.

12 Claims, 5 Drawing Sheets

(56) References Cited

U.S. PATENT DOCUMENTS

| | | | |
|---|---|---|---|
| 2007/0184809 A1* | 8/2007 | Muqattash et al. | 455/343.1 |
| 2007/0184870 A1* | 8/2007 | Muqattash et al. | 455/522 |
| 2008/0266698 A1* | 10/2008 | Shibayama et al. | 360/69 |
| 2010/0052925 A1* | 3/2010 | Hirabayashi et al. | 340/636.1 |
| 2011/0009144 A1* | 1/2011 | Kim et al. | 455/509 |
| 2012/0044542 A1* | 2/2012 | Nagano | 358/448 |
| 2012/0301145 A1* | 11/2012 | Kozaki et al. | 398/58 |

* cited by examiner

ELECTRONIC DEVICE PROVIDED WITH WIRELESS COMMUNICATION FUNCTION, DETECTION OF WHETHER THE ELECTRONIC DEVICE IS IN A USED CONDITION OR AN UNUSED CONDITION FUNCTION, AND SHIFTING THE ELECTRONIC DEVICE TO A POWER-SAVING MODE FUNCTION

BACKGROUND OF THE INVENTION

1. Field of the Invention

The present invention relates to an electronic device provided with a wireless communication function.

2. Description of Related Art

In recent years, there has been developed a system which, for example, makes a cellular phone and a wristwatch wirelessly connected with each other through a communication section such as Bluetooth (Bluetooth: registered trademark) for performing a communication to provide various connecting functions by using data communication between the cellular phone and the wristwatch.

In addition, there also has been such an electronic wristwatch that consumes less electric power, when an unused state of the electronic wristwatch continues for a predetermined period of time, by shifting to a power-saving mode where a predetermined function is stopped, in the field of an electronic wristwatch used while being put on a user.

In the field of wireless communication, electric power consumption of the wireless communication devices can be restricted to less amount by sending and receiving electric waves less frequently at a predetermined timing when the devices are wirelessly connected with each other. On the other hand, the wireless communication devices consume more electric power when the devices shift from a cut-off condition to a connected condition, because the devices need to send and receive electric waves for a longer period of time and more frequently.

Consequently, if an electric wristwatch used while being put on a user is equipped with a power-saving function and a wireless communication function, and if the electric wristwatch is set to execute a processing to automatically establish a wireless connection in response to a cancel of the power-saving mode without any ingenuities, the process for establishing the wireless connection is executed even when no devices on the other end exists around the electric wristwatch, thereby, problem of increasing in useless power consumption arises.

BRIEF SUMMARY OF THE INVENTION

An object of the present invention is to provide an electronic device provided with a wireless communication function which can reduce useless power consumption by appropriately controlling the wireless connection when the power-saving mode is canceled.

In order to achieve at least one of the objects mentioned above, according to an aspect of the present invention, there is provided an electronic device provided with a wireless communication function, including: a wireless communication section to wirelessly communicate with a predetermined external device; a first controlling section to cause the wireless communication section to establish a wireless connection with the predetermined external device to be in a condition communicable with each other; a condition detective section to detect whether the electronic device is in a used condition or in an unused condition; a second controlling section to shift the electronic device to a power-saving mode where a predetermined function is stopped, when the condition detective section detects the unused condition for a predetermined period of time; and a third controlling section to cancel the power-saving mode when the condition detective section detects the used condition after having shifted to the power-saving mode, wherein the second controlling section cuts off the wireless connection if the wireless connection still has not been cut off when the second controlling section shifts the electronic device to the power-saving mode; and the third controlling section changes a connecting processing for causing the first controlling section to establish the wireless connection after the power-saving mode was canceled, based on condition of the wireless connection from a time of detecting the last used condition by the condition detective section to a time of shifting to the power-saving mode.

According to an embodiment of the present invention, the electronic device changes the connecting processing to establish the wireless connection after the power-saving mode was canceled corresponding to the condition of the wireless connection at the time of shifting the processing to the power-saving mode. Consequently, the electronic device can reduce useless power consumption by appropriately predicting whether the external device on the other end exists around or not when the power-saving mode is canceled, and by performing processing for establishing the wireless connection corresponding to the prediction.

BRIEF DESCRIPTION OF THE SEVERAL VIEWS OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

In the following, an embodiment of the present invention will be described with reference to the accompanying drawings.

Figure 1:
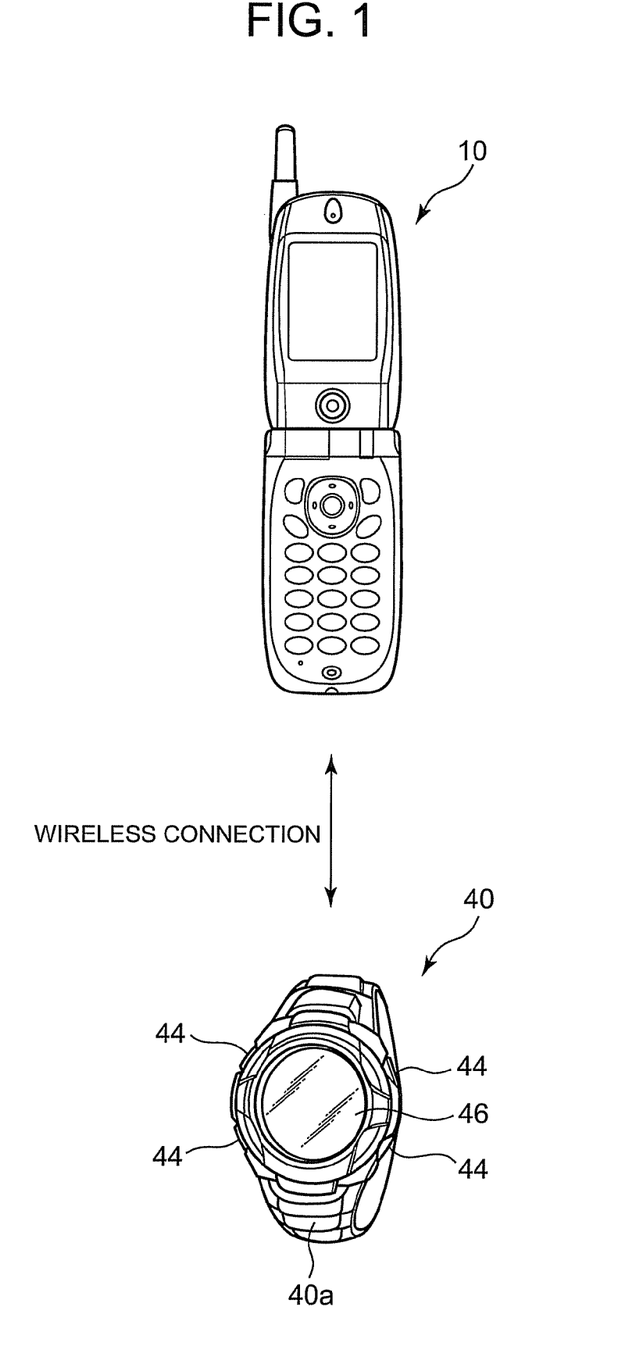
FIG. 1 is a view showing a communication system according to an electronic wristwatch of an embodiment of the present invention.
Figure 2:
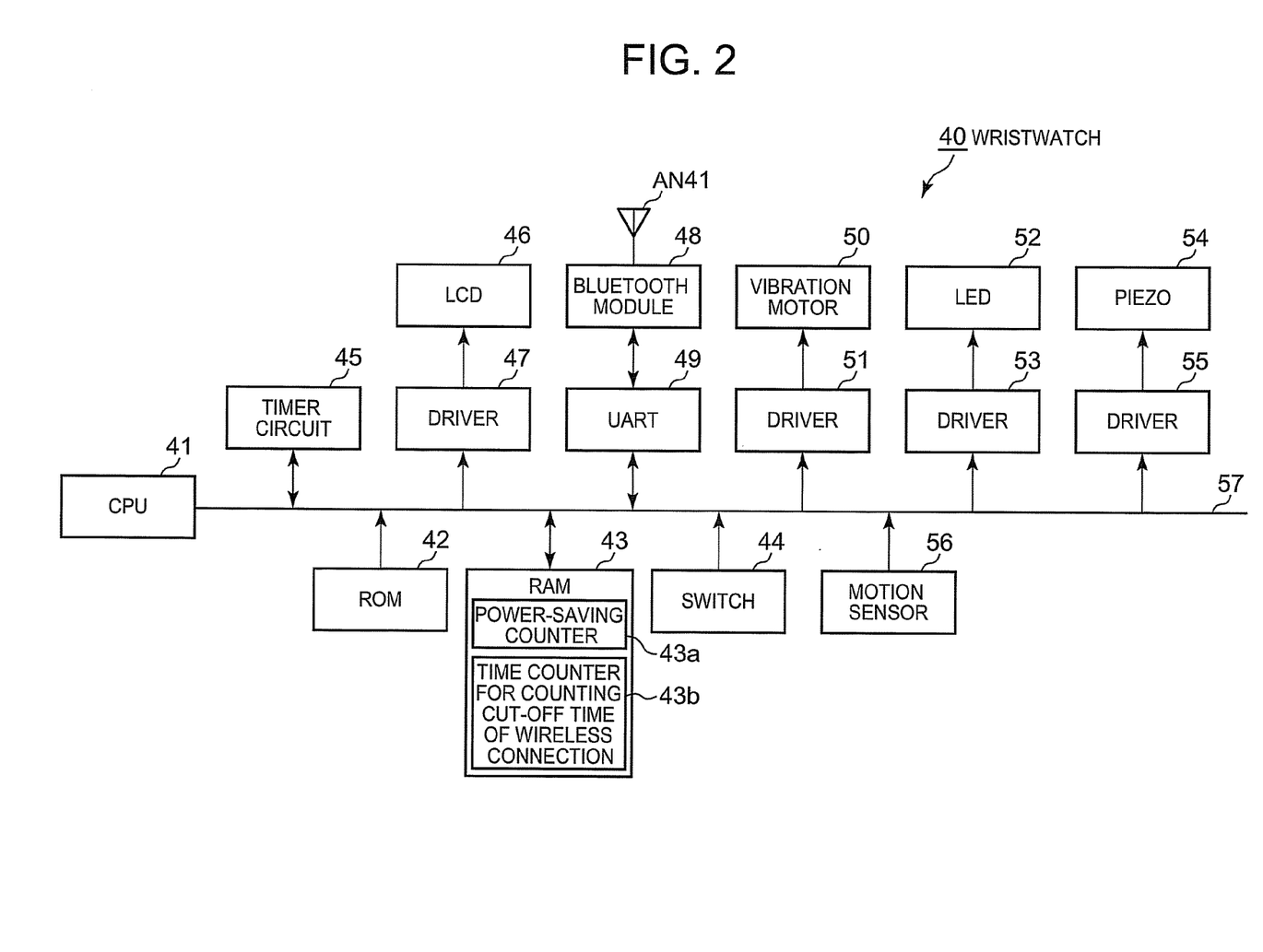
FIG. 2 is a block diagram showing an overall structure of the electronic wristwatch.

FIG. 1 is a view showing a communication system according to an electronic wristwatch (electronic device) of an embodiment of the present invention. FIG. 2 is a block diagram showing an overall structure of the electronic wristwatch.

As shown in FIG. 1, the electronic wristwatch 40 of this embodiment has a shape suitable for being used while being put on a user's arm by a band 40*a*, and provides various connecting functions by wirelessly being connected with a cellular phone 10, for example, and performing data communication therewith. For example, the electronic wristwatch 40 provides various connecting functions such as, when the cellular phone 10 receives an incoming call or an arrival of a mail, receiving the incoming information from the cellular phone 10 through the data communication, vibrating itself to notify a user of the information, or receiving accurate time data from the cellular phone 10 to adjust time of the electronic wristwatch 40.

Moreover, the electronic wristwatch 40 of this embodiment has power-saving function to reduce electric power by shifting to a power-saving mode where an output of a time display is stopped, for example, when the electronic wristwatch 40 is judged to be continuously in an unused condition for a predetermined period of time. The electronic wristwatch 40 returns to a usual mode to resume stopped functions when the electronic wristwatch 40 detects a used condition.

As shown in FIG. 2, the electronic wristwatch 40 includes: a central processing unit (CPU) 41 which totally controls the device; a read only memory (ROM) 42 which stores control programs executed by the CPU 41 and stores control data; a random access memory (RAM) 43 which supplies working memory space to the CPU 41; a switch 44 for receiving an operation to input command from the outside; a timer circuit 45 to count present time data; a liquid crystal display (LCD) 46 for displaying time and various functions; a liquid crystal driver 47 to drive the LCD 46; a Bluetooth module 48 as a wireless communication section to perform wireless communication (NFC: Near Field Communication, for example) via an antenna AN41; a universal asynchronous receiver transmitter (UART) 49 to perform data processing such as serial/parallel conversion to data sent and received via the Bluetooth module 48; a vibration motor 50 to give notice to a user by vibration, and a driver 51 thereof; a light emitting diode (LED) 52 to give notice to a user or light up dial plates by emitting light or blinking or the like, and a driver 53 thereof; a piezoelectric element 54 to give notice to a user an alarm by buzzer sound, and a driver 55 thereof; a motion sensor 56 as a motion detecting section to detect presence or absence of a motion; and a bus 57 to exchange signals between the CPU 41 and all the other parts. Among the above components, the switch 44 and the motion sensor 56 constitute a condition detective section.

The motion sensor 56 is a tilt switch in which switching condition changes from ON to OFF or OFF to ON by inclining or leveling the electronic wristwatch 40. According to this motion sensor 56, the fact of detecting the change of switching condition means detection of the presence of the motion, and the fact that the switching condition does not change means the absence of the motion.

The Bluetooth module 48 is used for data communication with the cellular phone 10 by using an electric wave while establishing a wireless connection with a Bluetooth module of the cellular phone 10. The Bluetooth module 48 continuously transmits request signals around the electronic wristwatch 40 to request a wireless connection in response to a reception of a command for the wireless connection. Then, if there is the cellular phone 10 registered beforehand as an object to be connected around the electronic wristwatch 40, the cellular phone 10 receives the request signal of the wireless connection and performs connecting processing, thereby the wireless connection between the electronic wristwatch 40 and the cellular phone 10 is established. After having established the wireless connection, the cellular phone 10 and the electronic wristwatch 40 are set to transmit and receive electric wave at predetermined time interval with each other, and then data communication with less electric power consumption is performed.

The RAM 43 is provided with a power-saving counter (first time counter) 43a and a time counter (second time counter) 43b for counting cut-off time of the wireless connection. The power-saving counter 43a is a counter for counting, in the usual mode, a duration time of the unused condition. The time counter 43b is a counter for counting, in the usual mode, a duration time since the wireless connection was cut off.

The ROM 42 stores: processing programs of various functions for realizing such as, a clock function for displaying time or activating an alarm at set time based on time data of the timer circuit 45, an input operation function for changing operation mode or setting various functions in response to an input from the switch 44, and a connecting function to connect to the cellular phone 10; a usual mode processing program for controlling, in the usual mode, transition management for shifting to the power-saving mode; a power-saving mode processing program for controlling, in the power-saving mode, returning management for shifting to the usual mode and; a wireless connection processing program for connecting or cutting the wireless connection, and so on. The wireless connection processing program and the CPU 41 executing the same constitute a wireless connection controlling section (first controlling section). Moreover, the usual mode processing program and the CPU 41 constitute a power-saving mode controlling section (second controlling section), and the power-saving mode processing program and the CPU 41 constitute a power-saving mode canceling section (third controlling section).

Next, processings as to the power-saving mode and the wireless connection of the electronic wristwatch 40 according to the embodiment of the present invention will be described.

Figure 3:
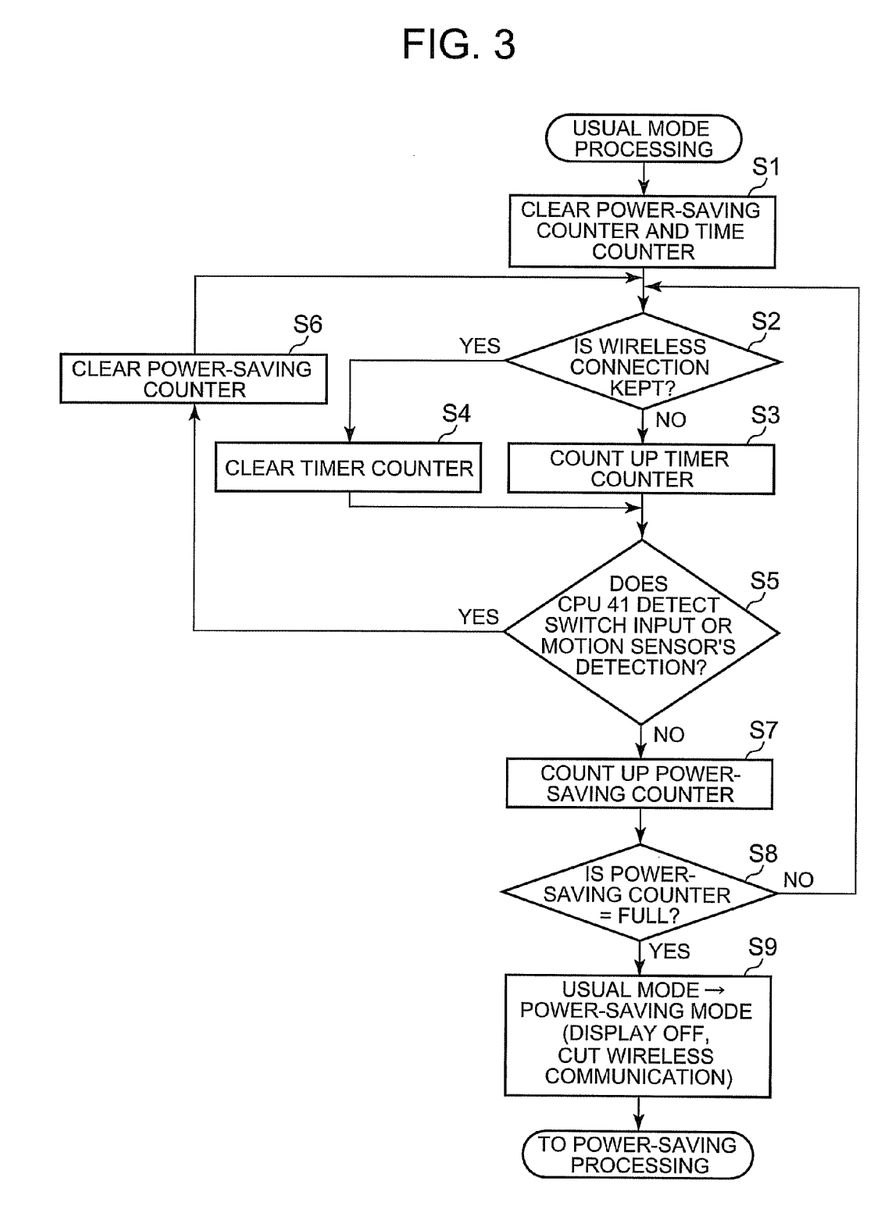
FIG. 3 is a flow chart showing a control procedure of a usual mode processing executed by a CPU of the electronic wristwatch.

FIG. 3 is a flow chart showing the usual mode processing executed by the CPU 41 of the electronic wristwatch 40.

The usual mode processing is a control processing to perform the transition management for shifting to the power-saving mode by judging whether a transition condition for shifting to the power-saving mode is satisfied or not. The usual mode processing is executed in the usual mode in parallel with each of the above-described processings for realizing the clock function, the input operation function, the connecting function to the cellular phone 10 and the wireless connection function.

When the usual mode processing starts in the usual mode, the CPU 41 initializes (clears) the power-saving counter 43a and the time counter 43b (Step S1), at first. Subsequently, the CPU 41 executes update processing of the time counter 43b and the power-saving counter 43a by a loop processing of Steps S2 to S8.

That is, the CPU 41 at first judges whether the wireless connection is kept or not at Step S2. The CPU 41 counts up the time counter 43b at Step S3 if the wireless connection is judged to be cut off, while the CPU 41 clears the time counter 43b if the wireless connection is judged to be maintained at Step S4.

Subsequently, the CPU 41 judges whether the input from the switch 44 or the detection of the motion by the motion sensor 56 is detected or not at Step S5. The CPU 41 counts up the power-saving counter 43a at Step S7 if the result of the detection is "NO", while the CPU 41 clears the power-saving counter 43a at Step S6 if the result of the detection is "YES".

Subsequently, the CPU 41 judges whether or not the counter value of the power-saving counter 43a reaches to a predetermined value "FULL" corresponding to the duration time of the unused condition, which leads the CPU 41 to shift to the power-saving mode, at Step S8. If the counter value of the power-saving counter 43*a* still does not reach to "FULL", the CPU 41 returns the processing back to Step S2.

That is, during the loop processing of Steps S2 to S8 described above, the duration time of the condition where the wireless connection is cut off is counted up by the time counter 43*b*, and the duration time of the condition in which the electronic wristwatch 40 is unused (condition with no switch input and no motion) is counted up by the power-saving counter 43*a*.

Then, when a predetermined period of time has passed with the electronic wristwatch 40 being unused, the counter value of the power-saving counter 43*a* reaches to the predetermined value "FULL" in the above loop processing, and the judgment processing is judged as "YES" at Step S8. If the judgment processing is judged as "YES", the CPU 41 changes a value of a status flag in the RAM 43 from a value of the usual mode to a value of the power-saving mode (Step 9). By this changing of the status flag, the display output of the LCD 46 is stopped in the processing for the clock function executed in parallel with the judgment processing, and processing for cutting off the wireless connection is executed if the wireless connection is connected in the wireless connection processing. In addition, the other processings are stopped.

Figure 4:
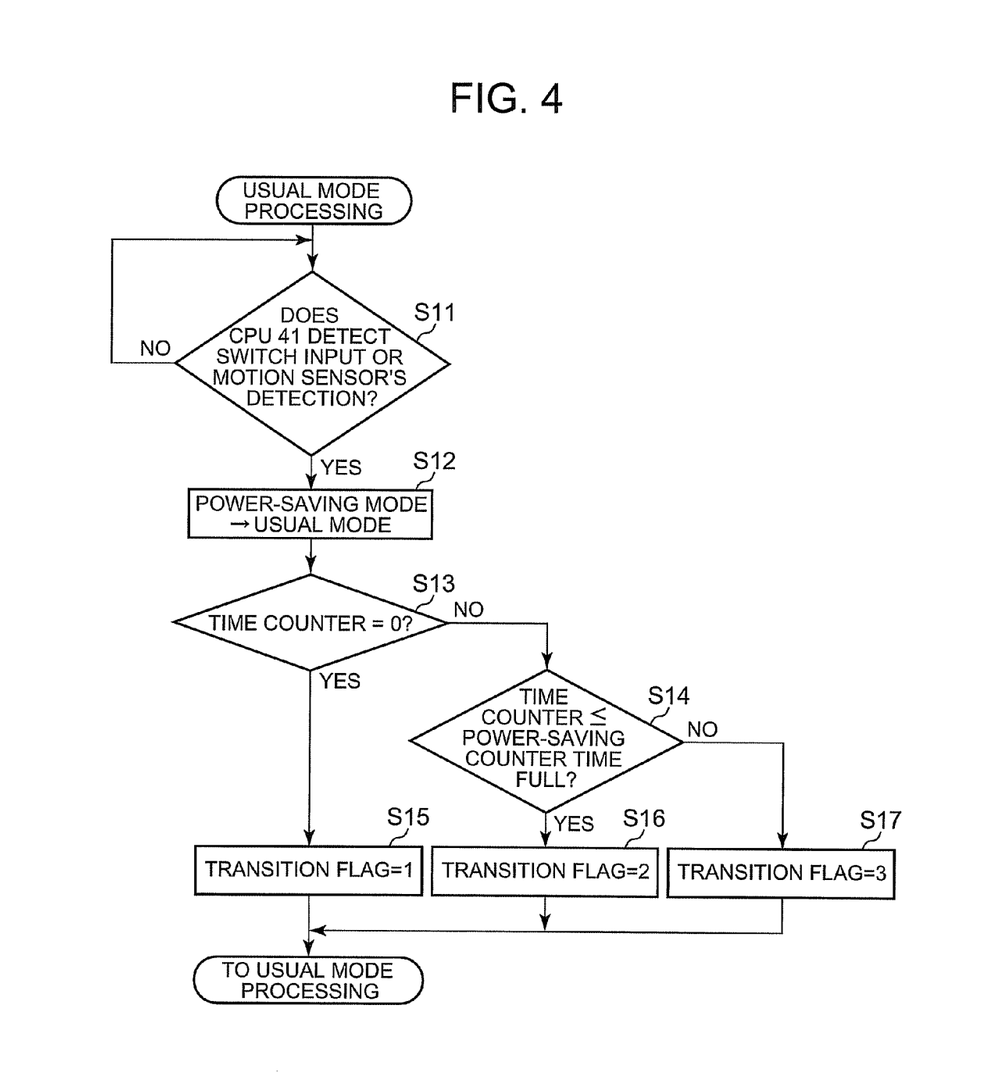
FIG. 4 is a flow chart showing a control procedure of a power-saving mode executed by the CPU of the electronic wristwatch.

After changing the status flag to the value of the power-saving mode, the CPU 41 finishes the usual mode processing and starts the power-saving mode processing shown below FIG. 4 shows the flow chart of the power-saving mode process.

The power-saving mode processing is a control processing to perform the returning management for shifting to the usual mode by judging whether a returning condition for shifting from the power-saving mode to the usual mode is satisfied or not. The power-saving mode processing is executed in the power-saving mode in parallel with the processing corresponding to the power-saving mode among the above-described processings for realizing the clock function.

When the power-saving mode processing starts in the power-saving mode, the CPU 41 monitors the presence or absence of the input from the switch 44 and the detection output of the motion sensor 56 (Step S11). The CPU 41 repeats the monitoring processing until the input from the switch 44 is detected or the presence of the motion is detected by the motion sensor 56.

Then, if the input from the switch 44 or the presence of the motion is detected, the CPU 41 proceeds the processing to the next step to firstly change value of the status flag in the RAM 43 from the value of the power-saving mode to the value of the usual mode (Step S12). By this changing of the status flag, the display output of the LCD 46 is restarted in the processing for the clock function executed in parallel with the power-saving mode processing, and the other processings which are suspended are restarted.

Next, the CPU 41 judges how the wireless connection status had changed before the shifting from the usual mode to the power-saving mode by reference to the value of the time counter 43*b* and the counted value of the power-saving counter 43*a*, which counted value is the value sufficient to be shifted to the power-saving mode (=the predetermined value "FULL"), at Steps S13 and S14 (judging section). That is, the CPU 41 firstly judges whether the value of the time counter 43*b* is zero (0) or not (Step S13). If the value is not zero, then the CPU 41 judges whether or not the value of the time counter 43*b* is equal to or less than the above-described predetermined value (Step S14).

Then, the CPU 41 sets "1" on a transition flag in the RAM 43 if the value of the time counter 43*b* is zero (referred to as a first case). The CPU 41 sets "2" on the transition flag in the RAM 43 if the value of the time counter 43*b* is more than zero and equal to or less than the predetermined value (referred to as a second case), and the CPU 41 sets "3" on the transition flag in the RAM 43 if the value of the time counter 43*b* is more than the predetermined value "FULL" (referred to as a third case).

The first case described above is the case where the electronic wristwatch 40 shifts from the usual mode to the power-saving mode after the passage of the predetermined period of time with being wirelessly connected to the cellular phone 10 even after the electronic wristwatch 40 is in the unused condition (the status with no inputs from the switch and no motions). In this first case, such a case is assumed as an example where a user takes off the electronic wristwatch 40, leaves the same at somewhere, and further also leaves the cellular phone 10 around the electronic wristwatch 40.

The second case described above is the case where the wireless connection to the cellular phone 10 is cut off after the electronic wristwatch 40 is in the unused condition, then afterwards, the electronic wristwatch 40 shifts from the usual mode to the power-saving mode after the duration time of the unused condition has reached to the predetermined period of time. In this second case, such a case is assumed as an example where a user takes off the electronic wristwatch 40, leaves the same at somewhere, and further moves to somewhere different with the cellular phone 10.

The third case described above is the case where the wireless connection to the cellular phone 10 is cut off before the electronic wristwatch 40 is in the unused condition, then afterwards, the electronic wristwatch 40 shifts from the usual mode to the power-saving mode after the duration time of the unused condition has reached to the predetermined period of time. In this third case, such a case is assumed as an example where a user leaves the cellular phone 10 at somewhere, moves to another place with the electronic wristwatch 40 being put on the user, then afterward takes off the electronic wristwatch 40 and leaves the same at a place apart from the cellular phone 10.

Then, after the CPU 41 sets value to the transition flag in accordance with judgment results of the first to third cases, the CPU 41 finishes the power-saving mode processing and starts the usual mode processing. This transition flag is used to select processing condition for establishing the wireless connection when the electronic wristwatch 40 returns from the power-saving mode to the usual mode.

Figure 5:
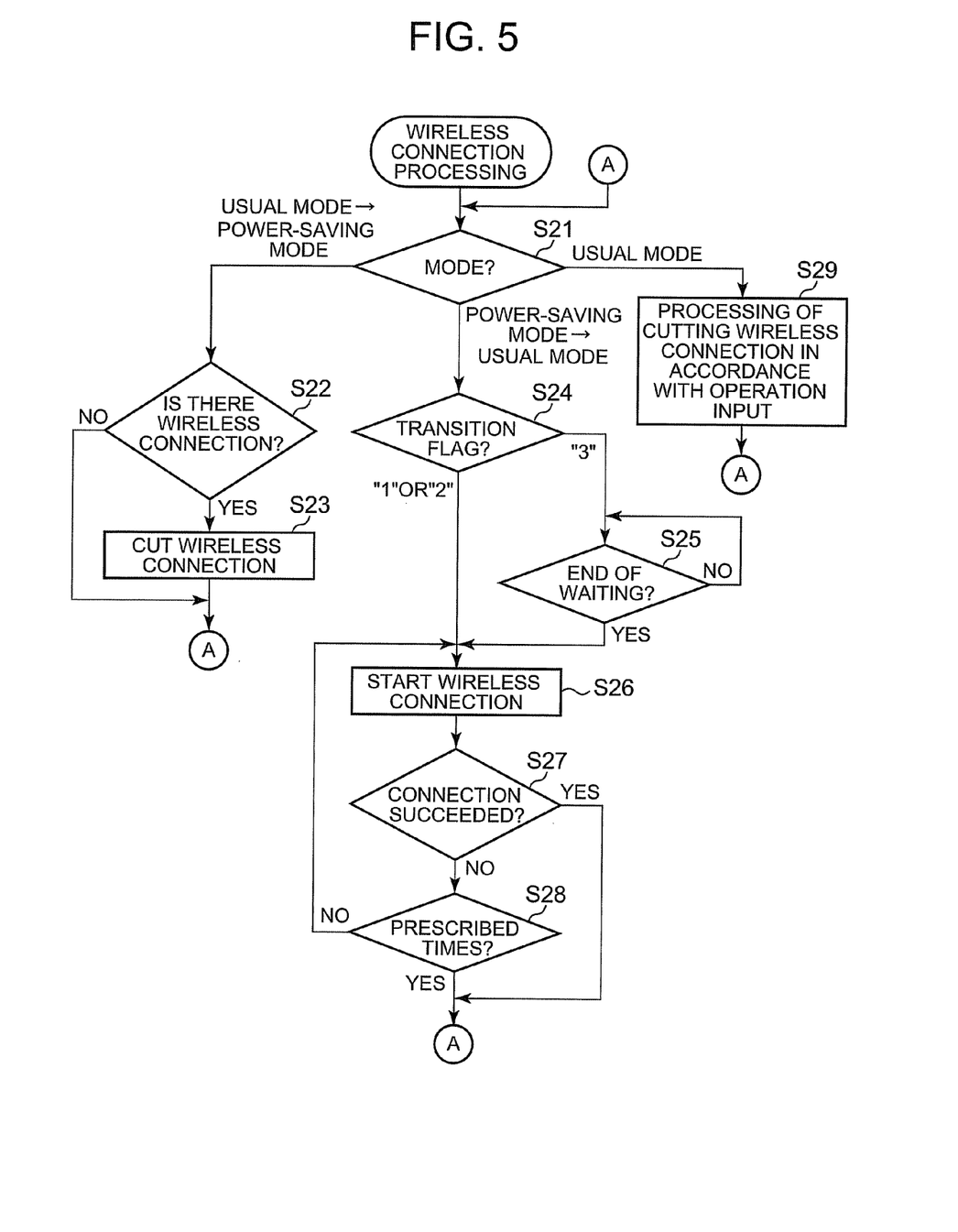
FIG. 5 is a flow chart showing a control procedure of a wireless connection processing executed by the CPU of the electronic wristwatch.

FIG. 5 is a flow chart showing the wireless connection processing executed by the CPU 41 in the electronic wristwatch 40.

This wireless connection processing is executed in the usual mode in parallel with the usual mode processing described above, and the processings for realizing the clock function, the input operation function and the connecting function to connect to the cellular phone 10.

The CPU 41 executes the wireless connection processing in accordance with the shifting of the mode while monitoring the shifting of the mode. That is, the CPU 41 firstly confirms the condition flag of the RAM 43 and confirms the presence of the shifting between the power-saving mode and the usual mode first (Step S21). Then the CPU 41 moves the processing to Step S22 if the shifting from the usual mode to the power-saving mode is confirmed, moves to Step S24 if the shifting from the power-saving mode to the usual mode is confirmed, and moves to S29 if the mode is still in the usual mode, respectively.

Then, the CPU 41 confirms whether the electronic wristwatch 40 is in condition of wirelessly being connected at the present time if the CPU 41 detects shifting from the usual mode to the power-saving mode (Step S22). The CPU 41 moves the processing back to Step S21 if the CPU 41 does not detect the wireless connection. The CPU 41, however, sends to the Bluetooth module 48 command to cut off the wireless connection and makes the Bluetooth module 48 cut off the wireless connection if the CPU 41 detects the wireless connection (Step S23). Then afterward, the CPU 41 returns the processing to Step S21.

Moreover, the CPU 41 performs judgment processing in accordance with the value of the transition flag in the RAM 43 if the CPU 41 detects the shifting from the usual mode to the power-saving mode (Step S24), and the CPU 41 executes the wireless connection processing in accordance with the value of the transition flags.

That is, the CPU 41 immediately send to the Bluetooth module 48 command for establishing the connection and makes the Bluetooth module 48 start the wireless connection if the value of the transition flag is "1" or "2" (Step S26). On the other hand, if the value of the transition flag is "3", the CPU 41 executes a waiting processing of a predetermined period of time (Step S25), and then makes the Bluetooth module 48 start the wireless connection (Step S26). Here, the CPU 41 constitutes a seventh controlling section, while constituting a fifth, a sixth, and a fourth controlling sections when the values of the transition flag are "1", "2", and "3", respectively.

After the CPU 41 has started the wireless connection, the CPU 41 confirms whether the wireless connection has succeeded or not (Step S27). The CPU 41 then returns the processing to Step S21 if the wireless connection has succeeded. On the other hand, if the wireless connection has not succeed, the CPU 41 confirms whether the processing of the wireless connection has been repeated for a prescribed times or not (Step S28). If the processing has not been repeated for the prescribed times yet, the CPU 41 repeats the processing from Step S26 again. If the connection has not succeeded after repeating the wireless connection processing for the prescribed times, the CPU 41 returns the processing to Step S21 without the wireless connection because the CPU 41 can judge that no corresponding objects (Cellular phone 10) to be communicated on the other end is around the electronic wristwatch 40.

Moreover, the CPU 41 confirms whether the operation command for establishing or cutting off the wireless connection is input from the switch 44 or not if the CPU 41 is still in the usual mode in the judgment processing at Step S21. The CPU 41 executes nothing if the above input operation commands are not confirmed. The CPU 41 starts or cuts off the processing of the wireless connection corresponding to these operation input if the above input operation commands are confirmed (Step S29). Then, the CPU 41 returns the processing to Step S21.

When the electronic wristwatch 40 shifts to the power-saving mode via the first case in the above described wireless connecting processing, it is assumed that the electronic wristwatch 40 and the cellular phone 10 are put each other around, and it can also be assumed that the cellular phone 10 is put around the electronic wristwatch 40 when the electronic wristwatch is moved and returned to the usual mode. The electronic wristwatch 40, therefore, immediately starts the wireless connection in accordance with the aforementioned condition.

Moreover, when the electronic wristwatch 40 shifts from the usual mode to the power-saving mode via the second case, it is assumed that, after the electronic wristwatch 40 has left, the user goes somewhere with taking the cellular phone 10, and it can also be assumed that the user takes the cellular phone 10 when the electronic wristwatch 40 is moved and returned to the usual mode. The electronic wristwatch 40 immediately starts the wireless connection in accordance with the aforementioned condition.

Moreover, when the electronic wristwatch 40 shifts to the power-saving mode via the third case, it is assumed that, after the cellular phone 10 has left somewhere, the user moves to another place and leaves the electronic wristwatch 40 there, thus it can also be assumed that, when the electronic wristwatch 40 is moved and returned to the usual mode, the distance between the electronic wristwatch 40 and the cellular phone 10 becomes shorter while the user equipped with the electronic wristwatch 40 moves to the place where the cellular phone 10 was left. The electronic wristwatch 40 starts the wireless connection after waiting for a predetermined period of time in accordance with the aforementioned condition.

In a wireless connecting processing, the processing condition of a wireless connection at a time that the electronic wristwatch 40 returns to the usual mode, is not limited to the examples mentioned above and such a modified example as described below can be applied. For example, in the case where the value of the transition flag is "1", it can be assumed that the cellular phone 10 is around the electronic wristwatch 40 at high possibility. Thus the electronic wristwatch 40 may immediately start the wireless connection and may repeat the wireless connection processing to a predetermined number of times at most with a short period of time (first period) if the wireless connection does not succeed. In the case where the value of the transition flag is "2", it is assumed that the cellular phone 10 is around the wristwatch 40 at middle possibility. Thus the electronic wristwatch 40 may immediately start the wireless connection and may repeat the wireless connection processing to a predetermined number of times at most with a middle period of time (second period) longer than the first period described above if the wireless connection does not succeed. In the case where the value of the transition flag is "3", it is assumed that the cellular phone 10 is not around the electronic wristwatch 40 and that the distance between the electronic wristwatch 40 and the cellular phone 10 may not becomes shorter unless a predetermined period of time has passed at high possibility. Thus the electronic wristwatch 40 may start the wireless connection not automatically but by user's operation.

Moreover, a processing time of a wireless connection processing at one time, in which the electronic wristwatch 40 keeps sending the request signals to a corresponding device (the cellular phone 10) to be connected on the other end to establish a wireless connection while awaiting a response from the corresponding devices, may be changed in accordance with the value of the transition flag. Moreover, an interval period till the wireless connection processing is performed again when the wireless connection does not succeed may be varied depending on the value of the transition flag.

As described above, according to the electronic wristwatch 40 of the embodiment, the processing condition of the wireless connection after returning to the usual mode is varied depending on the cases of how the condition of the wireless connection had changed when the electronic wristwatch 40 was shifted to the power-saving mode. Consequently, the electronic wristwatch 40 can adequately presume whether or not the cellular phone 10 is around the electronic wristwatch 40 or approaching nearer afterward when the electronic wristwatch 40 is shifted to the used condition, and can realize the effective wireless connection processing by executing the wireless connection processing with the condition based on the presumption.

In addition, according to the embodiment, the electronic wristwatch 40 judges the first to third cases, as patterns to shift to the power-saving mode. By the judgment, the electronic wristwatch 40 can adequately presume the situations such as, the order by which the user put the devices (the electronic wristwatch 40 and the cellular phone 10, for example) that are usually taken together by the user, whether the devices are put each other around or separately, at home, or the like. Consequently, based on the result of the judgment, the electronic wristwatch 40 can adequately presume what the order is by which the user takes these devices when he/she takes these devices afterward, and whether the cellular phone 10 is around the electronic wristwatch 40 or not when the electronic wristwatch 40 is taken by the user. Therefore the electronic wristwatch 40 can execute the wireless connection processing at an appropriate condition when the electronic wristwatch 40 returns to the usual mode.

Concretely, the electronic wristwatch 40 starts the wireless connection immediately after shifting to the usual mode in the case of having shifted to the power-saving mode via the first case or the second case, while the electronic wristwatch 40 starts the wireless connection after a predetermined period of time from shifting to the usual mode in the case of having shifted to the power-saving mode via the third case. Consequently, when the electronic wristwatch 40 is taken by the user and returns to the usual mode, the electronic wristwatch 40 can immediately start the wireless connection processing in the case where the cellular phone 10 can be presumed to be around the electronic wristwatch 40, and can immediately set the electronic wristwatch 40 and the cellular phone 10 in a condition wirelessly being connected with each other if the presumption is correct. Moreover, the electronic wristwatch 40 can avoid the increase in electric energy consumption caused by a useless wireless connection processing in the case where the cellular phone 10 can be presumed to be away from the electronic wristwatch 40.

Moreover, as shown above as the modified example, the electronic wristwatch 40 can perform the wireless connection processing more finely and appropriately in accordance with the situations, by changing the interval period of repeating the wireless connection processing till the wireless connection succeeds after returning to the usual mode, or changing the length period of the wireless connection processing per once, depending on the result of the judgment on the first to third cases.

Moreover, according to the embodiment, the electronic wristwatch 40 can judge the first to third cases described above by the power-saving counter 43*a* calculating the continuous period of the unused condition and the time counter 43*b* calculating the continuous period of cut-off condition of the wireless connection, each at the time of shifting from the usual mode to the power-saving mode. Therefore, the electronic wristwatch 40 can certainly execute these judgments by the processing with a lower workload.

Moreover, according to the embodiment, the electronic wristwatch 40 has the motion sensor 56 for detecting the unused condition, thereby can accurately detect the unused condition by distinguishing the condition of being taken by the user from the condition of being left at somewhere.

The present invention is not limited to the embodiment described above but can variously be arranged. For example, although the cellular phone 10 is exemplified above as the wireless communication correspondent, various devices such as, a portable computer like a smartphone or a Personal Digital Assistant (PDA), a digital camera, a portable measurement instrument such as a pedometer, can be applied.

Moreover, although the motion sensor 56 and the switch 44 through which the input operation is performed are exemplified as the condition detective section to detect the unused condition of the electronic wristwatch 40, to show the example of detecting the unequipped condition of the electronic wristwatch 40 as the unused condition, the condition detective section may further include a light sensor to detect incidence of light from outside and may judge the incidence of light from the outside as the used condition. Moreover, an acceleration sensor or a vibration sensor, as well as the tilt sensor, can be applied as the motion sensor 56.

Moreover, although the first to third cases are judged in the above embodiment, the condition of the wireless connection processing after returning to the usual mode may be selected based on the result of the judgment of more detailed transition patterns for shifting to the power-saving mode depending on an interval period from the time at which the electronic wristwatch 40 was left at somewhere to the time at which the wireless connection is cut off.

Besides, the details such as the operation condition of the electronic device in the power-saving mode or the wireless communication system, which are shown in the embodiment can adequately be modified within the scope of the present invention.

The entire disclosure of Japanese Patent Application No. 2010-271038 filed on Dec. 6, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An electronic device provided with a wireless communication function, comprising:
   a wireless communication section to wirelessly communicate with a predetermined external device;
   a first controlling section to cause the wireless communication section to establish a wireless connection with the predetermined external device to be in a condition communicable with each other;
   a condition detective section to detect whether the electronic device is in a used condition or in an unused condition;
   a second controlling section to shift the electronic device to a power-saving mode where a predetermined function is stopped, when the condition detective section detects the unused condition for a predetermined period of time; and
   a third controlling section to cancel the power-saving mode when the condition detective section detects the used condition after having shifted to the power-saving mode,
   wherein the second controlling section cuts off the wireless connection if the wireless connection still has not been cut off when the second controlling section shifts the electronic device to the power-saving mode; and
   the third controlling section changes a connecting processing for causing the first controlling section to establish the wireless connection after the power-saving mode was canceled, based on condition of the wireless connection from a time of detecting the last used condition by the condition detective section to a time of shifting to the power-saving mode.

2. The electronic device according to claim 1, wherein the third controlling section includes:
- a judging section to judge whether or not the shifting to the power-saving mode falls into a case where the wireless connection had been cut off before the used condition was finally detected by the condition detective section; and
- a fourth controlling section to cause the first controlling section to start the connection processing after a predetermined period of time since the power-saving mode is canceled, when the judging section judges that the shifting to the power-saving mode falls into the case.

3. The electronic device according to claim 2, wherein the third controlling section includes:
- a fifth controlling section to cause the first controlling section to start the connection processing immediately after the power-saving mode is canceled, when the judging section judges that the shifting to the power-saving mode does not fall into the case.

4. The electronic device according to claim 2, further comprising:
- a first time counter to count a duration time during which the condition detective section continuously detects the unused condition; and
- a second time counter to count a duration time during which the wireless connection of the wireless communication section is continuously cut off,
- wherein the judging section judges whether the shifting to the power-saving mode falls into the case or not, based on counted numbers of the first time counter and the second time counter.

5. The electronic device according to claim 1, wherein the third controlling section includes:
- a judging section to judge whether or not the shifting to the power-saving mode falls into a case where the wireless connection was cut off after the used condition has finally been detected by the condition detective section; and
- a sixth controlling section to cause the first controlling section to start the connection processing immediately after the power-saving mode is canceled, when the judging section judges that the shifting to the power-saving mode falls into the case.

6. The electronic device according to claim 5, further comprising:
- a first time counter to count a duration time during which the condition detective section continuously detects the unused condition; and
- a second time counter to count a duration time during which the wireless connection of the wireless communication section is continuously cut off,
- wherein the judging section judges whether the shifting to the power-saving mode falls into the case or not, based on counted numbers of the first time counter and the second time counter.

7. The electronic device according to claim 1, wherein the third controlling section includes:
- a judging section to judge,
    - a first case where the wireless connection has not been cut off when the electronic device is shifted to the power-saving mode;
    - a second case where the wireless connection was cut off after the used condition has finally been detected by the condition detective section and thereafter the electronic device is shifted to the power-saving mode; and
    - a third case where the wireless connection had been cut off before the used condition was finally detected by the condition detective section and thereafter the electronic device is shifted to the power-saving mode; and
- the third controlling section causes the first controlling section to execute the connection processing differently in at least between the first case and the third case or between the second case and the third case.

8. The electronic device according to claim 7, wherein the third controlling section includes:
- a seventh controlling section to cause the first controlling section to start the connection processing immediately after canceling the power-saving mode if the shifting to the power-saving mode falls into the first case or the second case; and to cause the first controlling section to start the connection processing after a predetermined period of time after the power-saving mode is canceled if the shifting to the power-saving mode falls into the third case.

9. The electronic device according to claim 7, further comprising:
- a first time counter to count a duration time during which the condition detective section continuously detects the unused condition; and
- a second time counter to count a duration time during which the wireless connection of the wireless communication section is continuously cut off,
- wherein the judging section judges the first case, the second case or the third case, based on counted numbers of the first time counter and the second time counter.

10. The electronic device according to claim 1, wherein the condition detective section includes a motion detecting section to detect presence or absence of a motion, and
the condition detective section detects the unused condition when the motion detecting section detects the absence of the motion.

11. An electronic device according to claim 1, further comprising a wristband for enabling the electronic device to be put on a user's arm.

12. The electronic device according to claim 11, further comprising:
- a time counting section to obtain present time information; and
- a time display section to display the present time information obtained by the time counting section.

* * * * *